(12) United States Patent
Jung

(10) Patent No.: US 9,399,408 B2
(45) Date of Patent: *Jul. 26, 2016

(54) METHOD OF CONTROLLING CREEP TORQUE IN MOTOR DRIVEN VEHICLE

(71) Applicants: Hyundai Motor Company, Seoul (KR); Kia Motors Corporation, Seoul (KR)

(72) Inventor: Jae Won Jung, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 4 days.

This patent is subject to a terminal disclaimer.

(21) Appl. No.: 14/539,147

(22) Filed: Nov. 12, 2014

(65) Prior Publication Data
US 2015/0360584 A1    Dec. 17, 2015

(30) Foreign Application Priority Data
Jun. 13, 2014  (KR) .......................... 10-2014-0072048

(51) Int. Cl.
*B60L 15/20* (2006.01)
*B60W 10/00* (2006.01)

(52) U.S. Cl.
CPC ......... *B60L 15/2063* (2013.01); *B60L 15/2045* (2013.01); *B60W 10/00* (2013.01); *B60L 2240/12* (2013.01); *B60L 2240/18* (2013.01); *B60L 2240/423* (2013.01); *B60L 2260/42* (2013.01)

(58) Field of Classification Search
CPC ............ B60L 15/2063; B60L 15/2045; B60L 2240/423; B60L 2260/42; B60L 2240/12; B60L 2240/18; B60W 10/00
See application file for complete search history.

(56) References Cited

U.S. PATENT DOCUMENTS

2012/0150384 A1* 6/2012  Jung et al. ................. 701/31.1
2013/0103282 A1* 4/2013  Oh et al. .................... 701/84

FOREIGN PATENT DOCUMENTS

| JP | H07-164925 | A | 6/1995 |
|---|---|---|---|
| JP | H10-023615 | A | 1/1998 |
| JP | 2005-204491 | A | 7/2005 |
| JP | 2012-090442 | A | 5/2012 |
| KR | 10-2004-0024198 | A | 3/2004 |
| KR | 10-2012-0058147 | | 6/2012 |
| KR | 10-2012-0059260 | A | 6/2012 |
| KR | 10-2012-0080720 | | 7/2012 |

* cited by examiner

*Primary Examiner* — Rodney Butler
(74) *Attorney, Agent, or Firm* — Mintz Levin Cohn Ferris Glovsky and Popeo, P.C.; Peter F. Corless

(57) ABSTRACT

A method of controlling creep torque in a motor driven vehicle is disclosed herein. In this method, a downhill gradient of a road is calculated. A filter time constant is calculated using the downhill gradient, a predetermined basic creep torque, a set speed and a compensation coefficient of the predetermined basic creep torque corresponding to the set speed. At a variable control step, the calculated filter time constant is applied to a filter, the predetermined basic creep torque is input to the filter, and a motor is controlled based on a torque value output from the filter as a request torque.

9 Claims, 8 Drawing Sheets

METHOD OF CONTROLLING CREEP TORQUE IN MOTOR DRIVEN VEHICLE

CROSS REFERENCE TO RELATED APPLICATION

The present application claims priority to Korean Patent Application Number 10-2014-0072048 filed on Jun. 13, 2014, whereby the entire contents of which application are incorporated herein for all purposes by this reference.

BACKGROUND

1. Technical Field

The present disclosure relates to a method of controlling creep torque in a motor driven vehicle which is devised to prevent the vehicle from consuming an excessive amount of energy and unintentionally accelerating on a downhill incline.

2. Description of the Related Art

Vehicles driven by an electric motor, such as electric vehicles, hybrid vehicles and fuel cell vehicles, require additional control for creep travel since they have no idle torque, unlike internal combustion engine vehicles. In addition, since step control may cause ride discomfort when performed during the application of creep torque, a smooth torque is output to the motor through filtering. In the calculation of a time constant for the filtering, determination of the time constant of the torque filter in the creep torque control has the following trade-off relationship:

1. The time constant is reduced for the purpose of smooth creep departure of the vehicle (in particular, in the case of driving uphill).

2. The time constant is increased in order to reduce abruptness during departure and reduce the creeping connection of a brake during braking (in particular, on a flat surface or a downhill incline).

Therefore, the smaller the time constant is, the more excessive the creep torque is. This excessively increases the amount of acceleration during downhill departure.

The information disclosed in the Background section is only for the enhancement of understanding of the background of the disclosure, and should not be taken as an acknowledgment or as any form of suggestion that this information forms the related art that would already be known to a person skilled in the art.

SUMMARY

Accordingly, the present disclosure has been made keeping in mind the above problems occurring in the related art. The present disclosure proposes a method of controlling creep torque for a motor driven vehicle that is devised to prevent the vehicle from consuming an excessive amount of energy and unintentionally accelerating on a downhill incline.

In order to achieve the above object, according to one aspect of the present disclosure, there is provided a method of controlling creep torque in a motor driven vehicle. The method includes a step of calculating a downhill gradient of a road; a step of calculating a filter time constant using the downhill gradient and a predetermined basic creep torque; and a variable control step of applying the calculated filter time constant to a filter, inputting the predetermined basic creep torque to the filter, and controlling a motor based on a torque value output from the filter as a request torque.

The filter time constant may be calculated using the downhill gradient, the predetermined basic creep torque, a set speed and a compensation coefficient of the predetermined basic creep torque corresponding to the set speed.

The filter time constant may be smaller than a maximum time constant calculated by the following formula:

$$k \le 2v_n\left[\frac{AT}{M}\{\ln(1-\alpha)\}^2 + 2g\theta\ln(1-\alpha)\right]^{-1},$$

where k is the filter time constant, $v_n$ is the set speed, A is $GR/R_{tire}$, i.e. a gear ratio divided by aradius of a tire, T is the predetermined basic creep torque, M is a mass of a vehicle, $\alpha$ is a correction factor for the predetermined basic creep torque, g is an acceleration of gravity, and $\theta$ is the downhill gradient that is a negative number.

The time constant may be greater than a minimum time constant calculated by the following formula:

$$k \ge 2v_n\left[\frac{AT}{M}\{\ln(1-\beta)\}^2 + 2g\theta\ln(1-\beta)\right]^{-1},$$

where k is the filter time constant, $v_n$ is the set speed, A is $GR/R_{tire}$, i.e. a gear ratio divided by aradius of a tire, T is the predetermined basic creep torque, M is a mass of a vehicle, $\beta$ is a correction factor for the predetermined basic creep torque, g is an acceleration of gravity, and $\theta$ is the downhill gradient that is a negative number.

The variable control step may include: applying the calculated filter time constant to the filter; producing basic gradeability by multiplying the predetermined basic creep torque with a gear ratio divided by a radius of a tire; inputting the basic gradeability to the filter; and controlling the motor based on the required gradeability output from the filter.

The variable control step may include: producing final gradeability by removing gravity from the required gradeability; and controlling the motor based on the final gradeability.

The gravity may be calculated by multiplying the mass of a vehicle, the acceleration of gravity and the downhill gradient.

The filter may be expressed by the following formula:

$$F(s) = \frac{1}{k_s s + 1},$$

where k is the filter time constant.

The step of calculating the filter time constant may include setting the predetermined basic creep torque as a maximum creep torque profile deduced from the following formula:

$$T \cong \frac{M}{A}(\ddot{x} + g\theta),$$

where T is the predetermined basic creep torque, M is a mass of a vehicle, A is a gear ratio divided by a radius of a tire, g is an acceleration of gravity, $\theta$ is the downhill gradient that is a negative number, and is $\ddot{x}$ an acceleration of vehicle.

The acceleration profile of the predetermined basic creep torque may be a target acceleration profile on a predetermined downhill gradient.

According to the method of controlling creep torque for a motor driven vehicle as set forth above, the filter time constant varies according to the gradient of a downhill incline. It is therefore possible to generate an optimum creep torque, thereby enhancing ride comfort and safety and improving fuel efficiency.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION OF THE EMBODIMENTS

Figure 1:
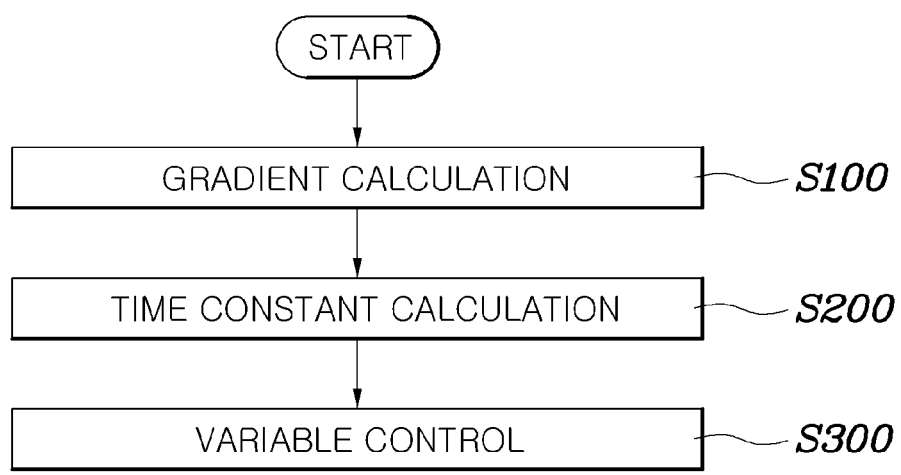
FIG. 1 is a flowchart showing a method of controlling creep torque in a motor driven vehicle according to an exemplary embodiment of the present disclosure.

Reference will now be made in greater detail to a method of controlling creep torque in a motor driven vehicle according to the present disclosure, exemplary embodiments of which are illustrated in the accompanying drawings. Wherever possible, the same reference numerals will be used throughout the drawings and the description to refer to the same or like parts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller suitable for controlling creep torque in a motor vehicle. The term "controller" refers to a hardware device that may include a memory and/or a processor. The memory may be configured to store program instructions, and the processor may be configured to execute the program instructions to perform one or more processes which are described further below.

The present disclosure is intended to prevent a motor driven vehicle from excessively accelerating on a downhill incline. The method of controlling creep torque in a motor driven vehicle according to an exemplary embodiment of the present disclosure includes: the downhill gradient calculation step S100 of calculating a downhill gradient of a road; the time constant calculation step S200 of calculating a filter time constant using the downhill gradient, a preset basic creep torque, a set speed and a compensation coefficient of the basic creep torque corresponding to the set speed; and the variable control step S300 of applying the calculated time constant to a filter, inputting the basic creep torque to the filter, and controlling a motor based on a torque value output from the filter as a request torque.

In general, a motor driven vehicle ensures safety on an uphill incline or the like by outputting an artificial creep torque from a motor. However, when the creep torque is uniformly processed and output, operation discomfort may occur compared to internal combustion engine vehicles of the related art.

Therefore, first, the downhill gradient of the road is calculated. The downhill gradient can be calculated using an altitude value from, for example, a G sensor or a precision map.

The basic creep torque is deduced, and the motor is driven based on the basic creep torque on a flatland. On a downhill incline, the motor is controlled by modifying the basic creep torque.

The motor is controlled by varying the graph shape of the basic creep torque based on the calculated downhill gradient. For this, a filter time constant is calculated using the downhill gradient, a preset basic creep torque, a set speed and a compensation coefficient of the basic creep torque corresponding to the set speed.

The calculated time constant is applied to the filter, the basic creep torque is input into the filter, and the motor is controlled using a torque value output from the filter as a request torque, whereby the degree of sensitivity at which the basic creep torque converges to a target value can be adjusted depending on the situation of the downhill gradient.

Figure 2:
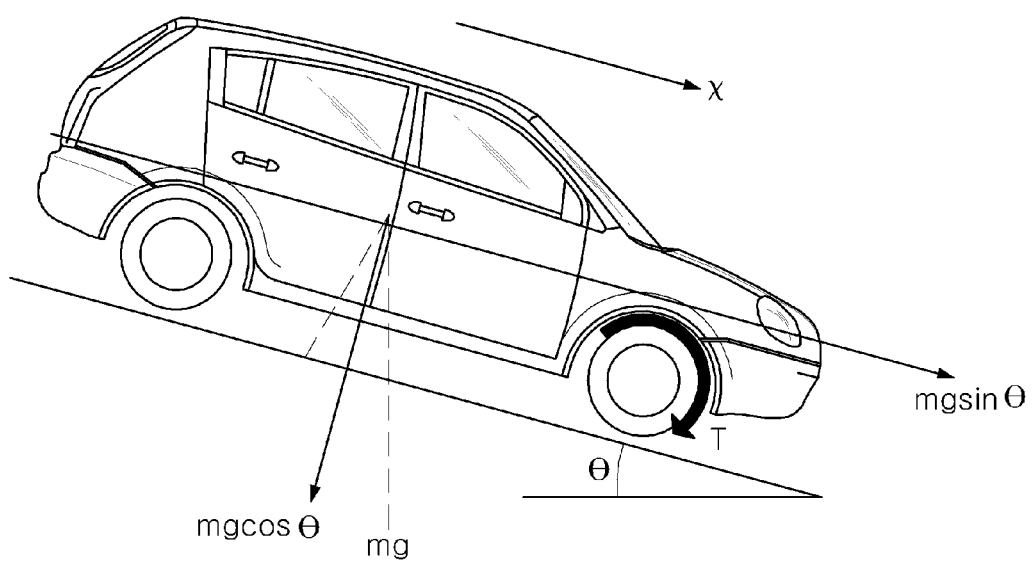
FIG. 2 is an explanatory view of the method of controlling creep torque in a motor driven vehicle according to an exemplary embodiment of the present disclosure.

Specifically, as shown in FIG. 2, the situation where the vehicle is on a downhill incline can be modeled by Equation 1 below:

$$M\ddot{x} = \Sigma F = -Mg\sin\theta + T\frac{GR}{R_{tire}} \quad \text{Formula 1}$$

$$\ddot{x} = \frac{1}{M}(-Mg\sin\theta + AT)\left(\leftarrow A = \frac{GR}{R_{tire}}\right)$$

$$\cong \frac{1}{M}(-Mg\theta + AT)(\leftarrow \sin(x) \cong x)$$

$$T \cong \frac{M}{A}(\ddot{x}+g\theta),$$

where A is a gear ratio divided by the radius of a tire (GR/$R_{tire}$), T is a basic creep torque, M is the mass of a vehicle, g is the acceleration of gravity, and θ is a downhill gradient.

Figure 6:
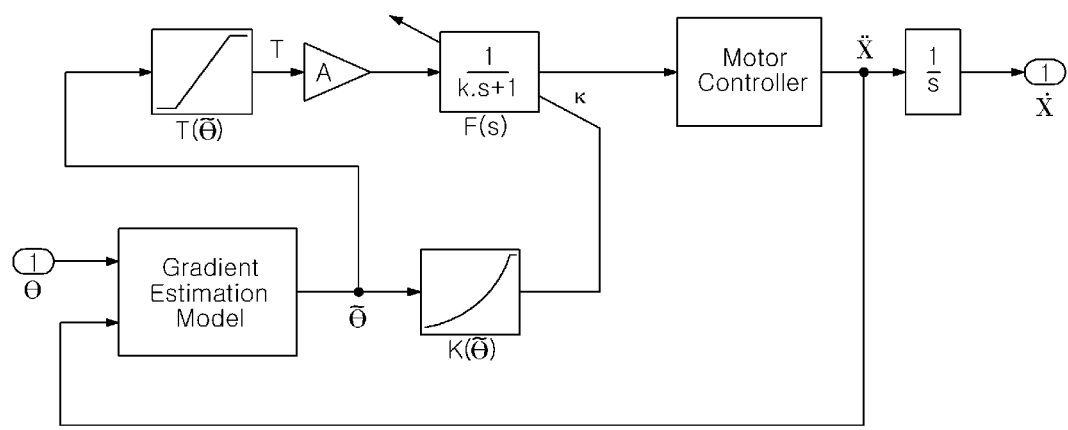
FIG. 6 is a block diagram showing the method of controlling creep torque in a motor driven vehicle according to an exemplary embodiment of the present disclosure.

FIG. 6 is a block diagram showing the method of controlling creep torque in a motor driven vehicle according to an exemplary embodiment of the present disclosure. According to the present disclosure, the downhill gradient θ is calculated and subsequently qualified (e.g., using an estimation model), and a time constant k is produced from the qualified value of the downhill gradient. The time constant k is then applied to the filter F(s), and a product of the basic creep torque T and A=GR/$R_{tire}$, i.e. the gear ratio divided by the radius of a tire, is applied to the filter, thereby producing required gradeability.

In addition, final gradeability is produced by removing gravity from the required gradeability, and a motor controller can control the motor based on the final gradeability. For reference, a drive torque required for the motor is calculated by dividing the final gradeability by A=GR/$R_{tire}$, i.e., the gear ratio divided by the radius of a tire. It is possible to perform torque control over the motor based on the drive torque.

Figure 8:
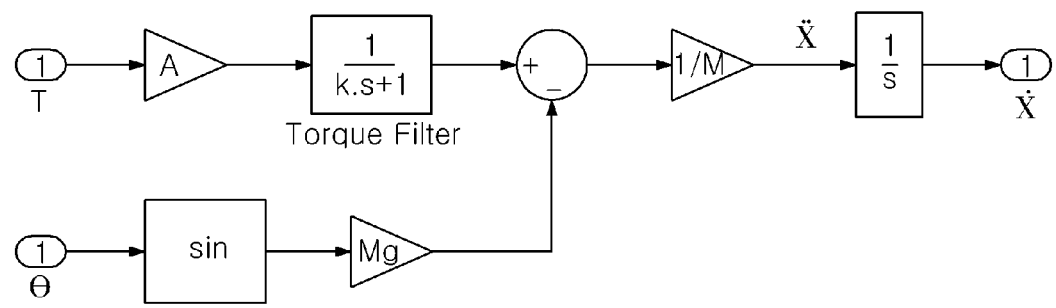
FIG. 8 is a block diagram showing a downhill travel mode of a vehicle.

The downhill travel modeling of a vehicle shown in FIG. 8 is expressed by Formula 2 below:

$$\dot{X}(s) = \frac{1}{M}\left\{-Mg\Theta(s) + \left(\frac{A}{ks+1}\right)T(s)\right\} = -\frac{g\theta}{s} + \left(\frac{A}{ks+1}\right)\frac{T}{s} \quad \text{Formula 2}$$

$$\dot{x}(t) = -g\theta t + \frac{AT}{M}t + \frac{ATk}{M}e^{-\frac{t}{k}} - \frac{ATk}{M}\{\leftarrow \dot{x}(0)=0\}$$

When subjected to inverse Laplace transform in a time domain, it is expressed as in the lower part.

Figure 3:
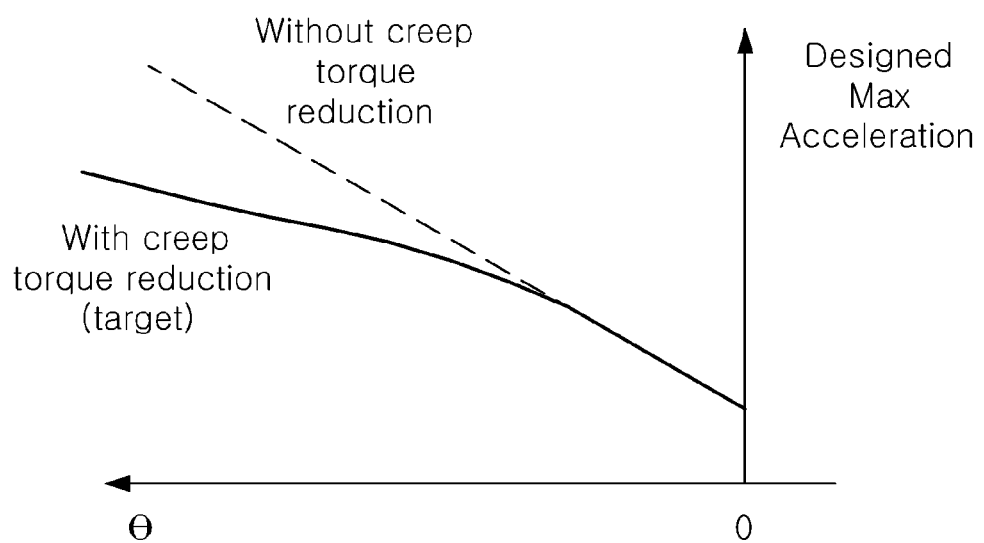
FIG. 3 is an example of a target acceleration graph for performing the method of controlling creep torque in a motor driven vehicle according to an exemplary embodiment of the present disclosure.
Figure 4:
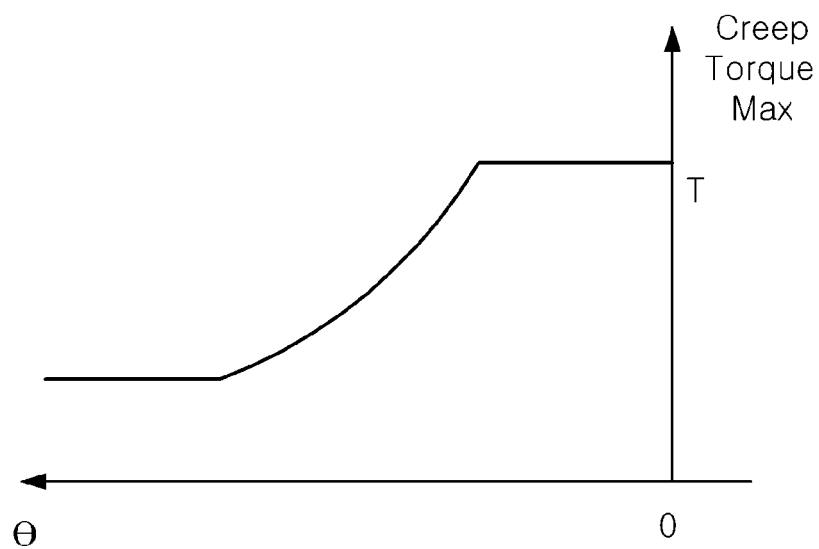
FIG. 4 is an example of a maximum creep torque graph for performing the method of controlling creep torque in a motor driven vehicle according to an exemplary embodiment of the present disclosure.

As shown in FIG. 3, the profile of an intended target acceleration is produced by modifying the profile of a target acceleration on the downhill incline as in FIG. 3. The acceleration profile is applied to $$T \cong \frac{M}{A}(\ddot{x}+g\theta)$$

in Formula 1, thereby creating the profile of a maximum creep torque, as shown in FIG. 4. This is referred to as a basic creep torque.

When Formula 2 is linearized through Fourier series expansion, it can be expressed as in Formula 3 below:

$$\dot{x}(t) = -g\theta t + \frac{AT}{M}t + \frac{ATk}{M}e^{-\frac{t}{k}} - \frac{ATk}{M} \quad \text{Formula 3}$$

$$\cong -g\theta t + \frac{AT}{M}t + \left(\frac{ATk}{M} - \frac{AT}{M}t + \frac{AT}{2Mk}t^2\right) - \frac{ATk}{M}$$

$$\cong -g\theta t + \frac{AT}{2Mk}t^2$$

In Formula 3 above, if it is assumed that the speed shall reach a set speed $V_n$ at a point in time $t_n$, Formula 3 is arranged as Formula 4 below:

$$\dot{x}(t_n) \cong -g\theta t_n + \frac{AT}{2Mk}t_n^2 = v_n \quad \text{Formula 4}$$

$$\Rightarrow t_n = \frac{g\theta + \sqrt{(g\theta)^2 + \frac{2AT}{Mk}v_n}}{\frac{At}{Mk}}$$

Therefore, if it is assumed that the creep torque shall converge to an intended torque γT at the point in time $t_n$ when the speed reaches the set speed $V_n$, it is possible to apply the result of Formula 4 to a creep torque model of Formula 5, thereby producing Formula 6:

$$T(t) = T - Te^{\frac{t}{k}} \quad \text{Formula 5}$$

and $$k = 2v_n\left[\frac{AT}{M}\{\ln(1-\gamma)\}^2 + 2g\theta\ln(1-\gamma)\right]^{-1}, \quad \text{Formula 6}$$

where k is a time constant, $v_n$ is a set speed, A is GR/$R_{tire}$, i.e., a gear ratio divided by the radius of a tire, T is a basic creep torque, M is the mass of a vehicle, γ is a correction factor for the basic creep torque, g is the acceleration of gravity, and θ is a downhill gradient (i.e., a negative number).

When controlling the intended creep torque to converge to γT, which is γ times the maximum creep torque (i.e., basic creep torque) at the point in time when the speed reaches the set target speed, the time constant of the filter for this purpose must be controlled as in Formula 6 above.

The basic creep torque is deduced by applying the downhill gradient to Formula 1, and the correction factor γ is preset according to the intended set speed $V_n$ at the intended point in time $t_n$. The time constant is determined when a measured value of the downhill gradient is applied as a variable thereto.

If the intended creep torque at point in time $t_n$ is equal to or greater than αT, the time constant must be smaller than the maximum time constant that is calculated by Formula 7 below:

$$k \le 2v_n\left[\frac{AT}{M}\{\ln(1-\alpha)\}^2 + 2g\theta\ln(1-\alpha)\right]^{-1}, \quad \text{Formula 7}$$

where k is a time constant, $v_n$ is a set speed, A is GR/$R_{tire}$, i.e., a gear ratio divided by the radius of a tire, T is a basic creep torque, M is the mass of a vehicle, α is a correction factor for the basic creep torque, g is the acceleration of gravity, and θ is a downhill gradient (i.e., a negative number).

If the intended creep torque at point in time $t_n$ is equal to or smaller than βT, the time constant must be greater than the minimum time constant that is calculated by Formula 8 below:

$$k \ge 2v_n\left[\frac{AT}{M}\{\ln(1-\beta)\}^2 + 2g\theta\ln(1-\beta)\right]^{-1}, \quad \text{Formula 8}$$

where k is a time constant, $v_n$ is a set speed, A is GR/$R_{tire}$, i.e., a gear ratio divided by the radius of a tire, T is a basic creep torque, M is the mass of a vehicle, β is a correction factor for the basic creep torque, g is the acceleration of gravity, and θ is a downhill gradient (i.e., a negative number).

Figure 5:
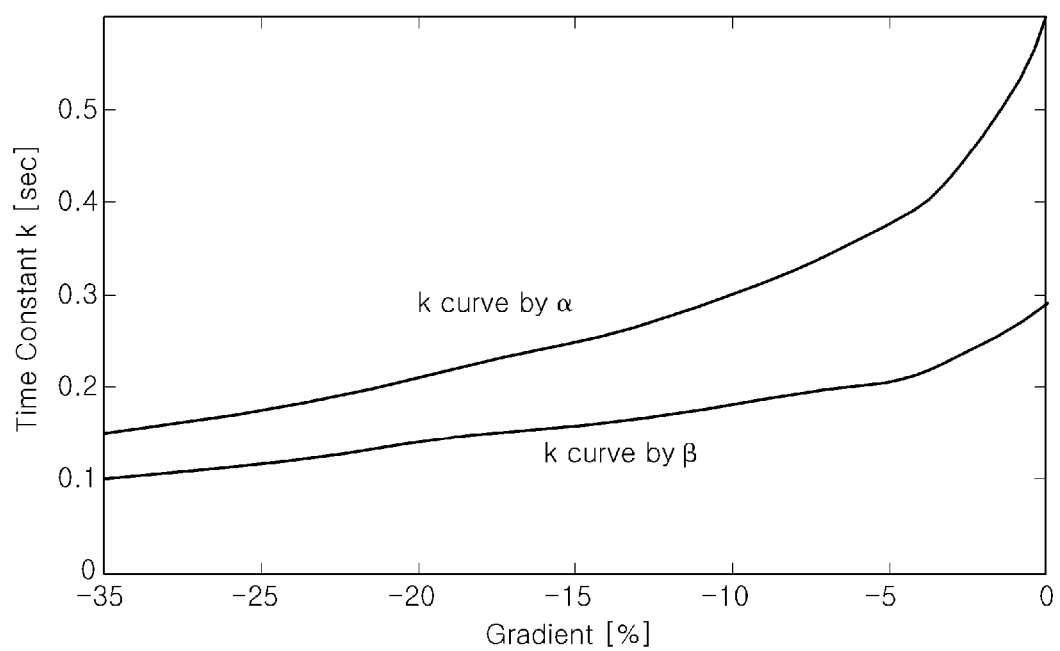
FIG. 5 is an example of a time constant graph for performing the method of controlling creep torque in a motor driven vehicle according to an exemplary embodiment of the present disclosure.

The time constant is selected between the maximum and minimum time constant values, i.e., between the k curve by α and the k curve by β in the graph of FIG. 5, and the correction factor γ that was discussed above can be used as a proper intermediate value.

In the meantime, the variable control step S300 can apply the calculated time constant to the filter, produce the basic gradeability by multiplying the basic creep torque with the gear ratio divided by the radius of a tire, input the basic gradeability to the filter, and control the motor based on the required gradeability output from the filter. The variable control step can also produce the final gradeability by removing the gravity from the required gradeability and subsequently control the motor based on the final gradeability. In addition, the gravity can be calculated by multiplying the mass of the vehicle, the acceleration of gravity and the downhill gradient. A transfer function F(s) of the filter can be expressed by Formula 9 below:

$$F(s) = \frac{1}{k_t s + 1} \quad \text{Formula 9}$$

Figure 7:
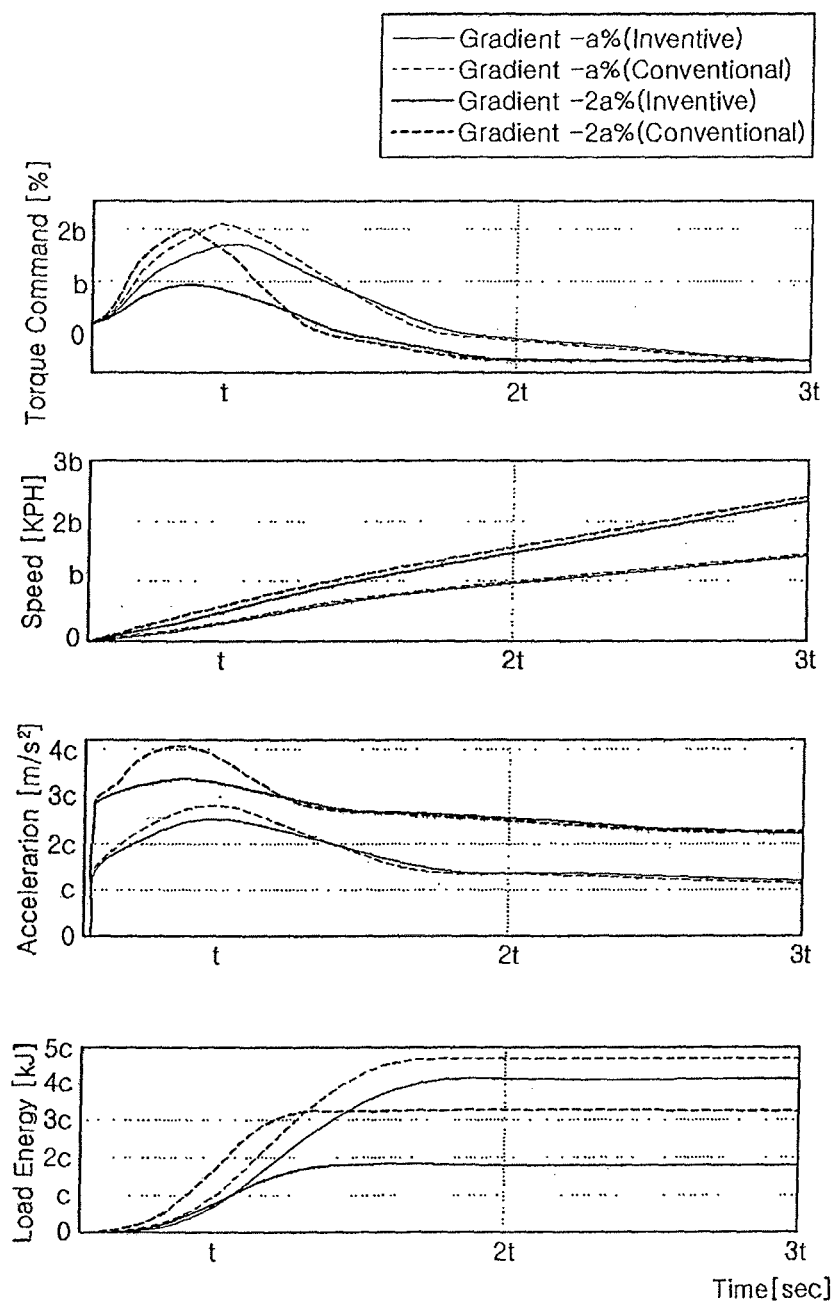
FIG. 7 shows graphs of the effects of the method of controlling creep torque in a motor driven vehicle according to an exemplary embodiment of the present disclosure.

FIG. 7 shows graphs comparing the effects of the method of controlling creep torque in a motor driven vehicle according to an exemplary embodiment of the present disclosure. It is appreciated that, when the time constant of the creep torque is changed according to the downhill gradient, the maximum value of the motor torque (e.g., torque command) decreases and the rising rate is slowed down. It is also appreciated that the peak of acceleration decreases and final load energy is reduced.

According to the method of controlling creep torque in a motor driven vehicle as set forth above, since the time constant varies according to the gradient, it is possible to generate an optimum creep torque, thereby enhancing ride comfort and safety. It is also possible to prevent excessive acceleration on a downhill incline, thereby improving fuel efficiency.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A method of controlling creep torque in a motor driven vehicle, comprising:
   calculating a downhill gradient of a road;
   calculating a filter time constant using the downhill gradient and a predetermined basic creep torque; and
   a variable control step of applying the calculated filter time constant to a filter, inputting the predetermined basic creep torque to the filter, and controlling a motor of the motor driven vehicle based on a torque value output from the filter as a request torque,
   wherein the variable control step comprises:
      applying the calculated filter time constant to the filter;
      producing basic gradeability by multiplying the predetermined basic creep torque with a gear ratio divided by a radius of a tire;
      inputting the basic gradeability to the filter; and
      controlling the motor based on the required gradeability output from the filter.

2. The method according to claim 1, wherein the filter time constant is calculated using the downhill gradient, the predetermined basic creep torque, a set speed and a compensation coefficient of the predetermined basic creep torque corresponding to the set speed.

3. The method according to claim 2, wherein the filter time constant is smaller than a maximum time constant calculated by the following formula:

$$k \leq 2v_n \left[ \frac{AT}{M} \{\ln(1-\alpha)\}^2 + 2g\theta\ln(1-\alpha) \right]^{-1},$$

where k is the filter time constant, $v_n$ is the set speed, A is a gear ratio divided by a radius of a tire, T is the predetermined basic creep torque, M is a mass of a vehicle, α is a correction factor for the predetermined basic creep torque, g is an acceleration of gravity, and θ is the downhill gradient that is a negative number.

4. The method according to claim 2, wherein the filter time constant is greater than a minimum time constant calculated by the following formula:

$$k \geq 2v_n \left[ \frac{AT}{M} \{\ln(1-\beta)\}^2 + 2g\theta\ln(1-\beta) \right]^{-1},$$

where k is the filter time constant, $v_n$ is the set speed, A is a gear ratio divided by a radius of a tire, T is the predetermined basic creep torque, M is a mass of a vehicle, β is a correction factor for the predetermined basic creep torque, g is an acceleration of gravity, and θ is the downhill gradient that is a negative number.

5. The method according to claim 1, wherein the variable control step comprises:
   producing final gradeability by removing gravity from the required gradeability; and
   controlling the motor based on the final gradeability.

6. The method according to claim 5, wherein the gravity is calculated by multiplying a mass of a vehicle, an acceleration of gravity and the downhill gradient.

7. The method according to claim 1, wherein the filter is expressed by the following formula:

$$F(s) = \frac{1}{k_t s + 1},$$

where k is the filter time constant.

8. The method according to claim 1, wherein calculating the filter time constant comprises setting the predetermined basic creep torque as a maximum creep torque profile deduced from the following formula:

$$T \cong \frac{M}{A}(\ddot{x} + g\theta),$$

where T is the predetermined basic creep torque, M is a mass of a vehicle, A is a gear ratio divided by a radius of a tire, g is an acceleration of gravity, θ is the downhill gradient that is a negative number, and ẍ is an acceleration of vehicle.

9. The method according to claim 8, wherein an acceleration profile of the predetermined basic creep torque is a target acceleration profile on a predetermined downhill gradient.

* * * * *